United States Patent [19]

Ono et al.

[11] Patent Number: 5,239,553
[45] Date of Patent: Aug. 24, 1993

[54] DISCHARGE-PUMPED GAS LASER WITH BAFFLE PARTITION FOR CONTROLLED LASER GAS FLOW AT PREIONIZERS

[75] Inventors: Takuhiro Ono, Zama; Naoya Horiuchi, Kawasaki; Keiichiro Yamanaka, Kawasaki; Kenichi Takahata, Kawasaki; Nobuaki Furuya, Kawasaki; Takeo Miyata, Zama, all of Japan

[73] Assignee: Matsushita Electric Industrial Co., Ltd., Osaka, Japan

[21] Appl. No.: 872,247

[22] Filed: Apr. 22, 1992

[30] Foreign Application Priority Data

| Apr. 23, 1991 | [JP] | Japan | 3-092018 |
| Apr. 23, 1991 | [JP] | Japan | 3-092019 |
| Apr. 24, 1991 | [JP] | Japan | 3-094030 |
| Oct. 15, 1991 | [JP] | Japan | 3-265888 |

[51] Int. Cl.$^5$ ............................................. H01S 3/22
[52] U.S. Cl. ............................................. 372/58; 372/86
[58] Field of Search ............................... 372/58, 59, 86

[56] References Cited

U.S. PATENT DOCUMENTS

| 4,635,269 | 1/1987 | Reilly et al. | 372/58 |
| 4,646,310 | 2/1987 | Koseki | 372/58 |
| 5,033,056 | 7/1991 | Perzl | 372/58 |

FOREIGN PATENT DOCUMENTS 63-100786 5/1988 Japan .

OTHER PUBLICATIONS

"Sealed, Miniaturized, Corona-Preionized, High-Repetition-Rate TEA CO2 Laser Using Hydrogen Buffered Gas Mixtures" by R. Marchetti, et al., IEEE Journal of Quantum Electronics vol. QE-21 No. 11, Nov. 1985, pp. 1766-1771.

Primary Examiner—Leon Scott, Jr.
Attorney, Agent, or Firm—Lowe, Price, LeBlanc & Becker

[57] ABSTRACT

A discharge-pumped gas laser has a pressure container filled with a laser gas under pressure and a pair of elongate main discharge electrodes. The main discharge electrodes are disposed in the pressure container in confronting relationship to each other for producing an electric discharge in the laser gas in a main discharge region defined therebetween to excite the laser gas for laser emission. The laser gas is circulated to flow through the main discharge region in a direction perpendicular to the main discharge electrodes. The laser gas in the main discharge region is preionized by an UV preionizer disposed either upstream or downstream of the main discharge region with respect to the direction of flow of the laser beam. The pressure container houses a baffle partition for controlling the laser gas to flow past one of the main discharge electrodes and the preionizer while blocking the laser gas from directly flowing to the other of the main discharge electrodes and the preionizer.

36 Claims, 9 Drawing Sheets

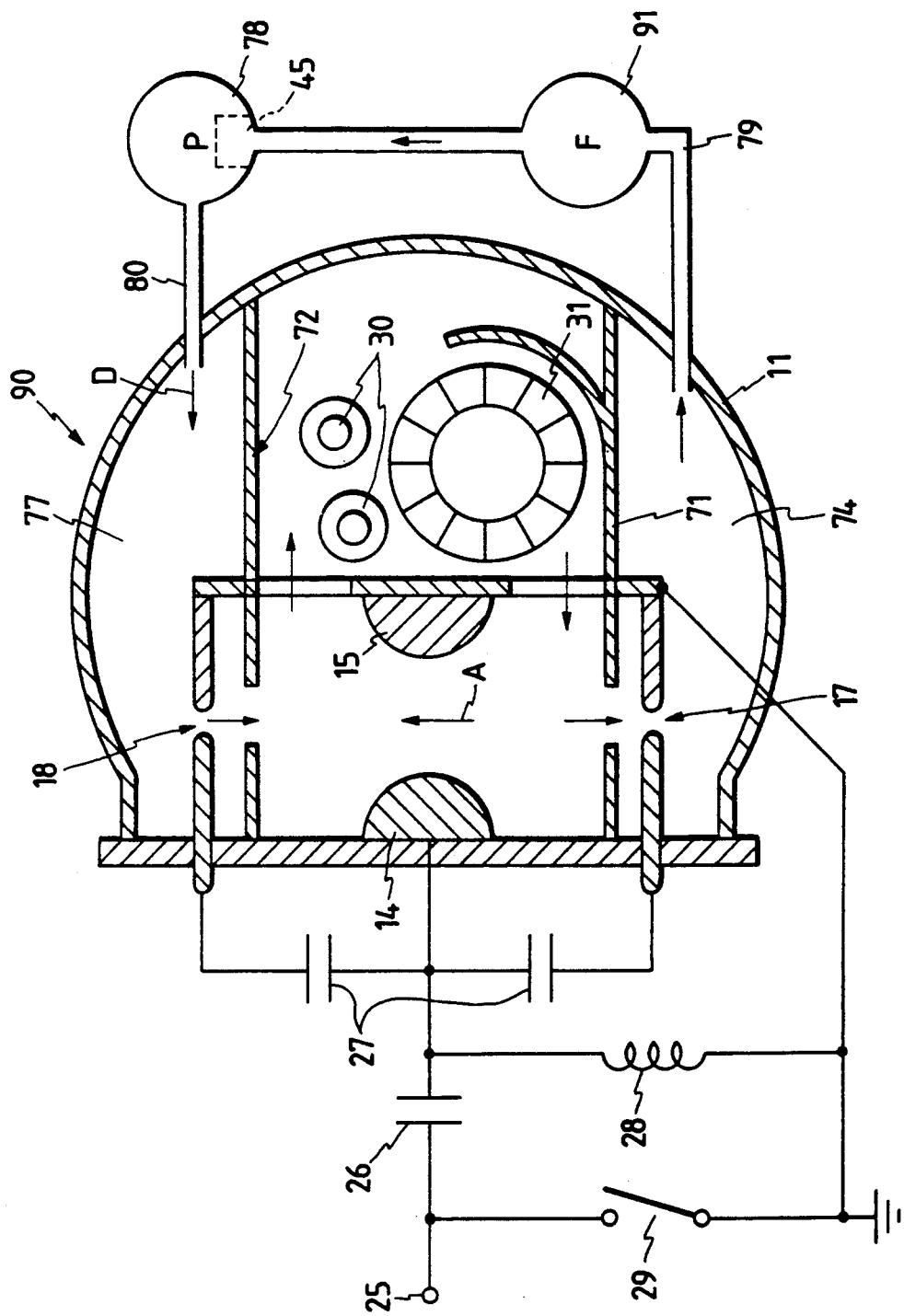

DISCHARGE-PUMPED GAS LASER WITH BAFFLE PARTITION FOR CONTROLLED LASER GAS FLOW AT PREIONIZERS

BACKGROUND OF THE INVENTION

1. Field of the Invention

The present invention relates to a discharge-pumped gas laser with preionizers, and more particularly to a high-repetition-rated discharge-pumped gas laser which is capable of developing a stable electric discharge between main discharge electrodes through the control of a laser gas flowing between the main discharge electrodes and a laser gas flowing through preionizers.

2. Description of the Prior Art

Discharge-pumped gas lasers, particularly discharge-pumped rare-gas-halide excimer lasers, can be excited for highly efficient high-output laser emission at a high repetition rate. For this reason, the discharge-pumped gas lasers are used as laser emission sources in a wide variety of applications including research and development activities, semiconductor fabrication processes, chemical engineering processes, materials processing applications, and medical applications among other fields.

Some conventional discharge-pumped gas lasers have ultraviolet preionizers which cause a spark discharge to preionize the laser gas in a main discharge region between confronting main discharge electrodes. The laser gas is deteriorated because it contains ions and metal particles emitted from the preionizers due to sputtering upon the spark discharge. When a deteriorated laser gas remains present in the main discharge region between the main discharge electrodes, the electrons produced by the preionization of the laser gas are not spatially distributed uniformly in the main discharge region. Therefore, the main discharge current flowing through the main discharge region between the main discharge electrodes is localized, tending to produce an arc discharge and result in low laser emission efficiency. As a result, the discharge-pumped gas lasers emit laser beams of relatively small spot size and low output level, and the main discharge electrodes have a short service life.

Furthermore, the electrode pins of a preionizer located downstream of the main discharge region tend to be heated and damaged by a deteriorated high-temperature laser gas containing ions and metal particles emitted from the main discharge electrodes. The electrode pins of the downstream preionizer are worn quickly particularly during repetitive operation of an excimer laser. In a KrF excimer laser, for example, the electrode pins of the preionizer that are heated to high temperature and the fluorine gas rapidly react with each other, and hence the electrode pins are worn and the fluorine gas are consumed at a high rate. Consequently, it is difficult to accomplish stable laser emission at a high repetition rate in such an excimer laser.

In order for a discharge-pumped gas laser to emit a stable laser beam with high laser emission efficiency, it is necessary that no deteriorated laser gas remain present in the main discharge region. To meet this requirement, the laser gas should be circulated at high speed through the main discharge region as a laminar gas flow. Generally, the repetition frequency f (Hz) of laser emission and a minimum laser gas speed V (m/sec.) that is necessary are related to each other according to the following equation:

$$V = f \times L \times CR$$

where L is the distance (m) between the gap of the preionizer, which is located upstream of the main discharge region, and the downstream end of the main discharge electrodes, and CR is the clearing ratio which has a value of 1 when the laser gas flow is a complete laminar flow and a larger value as the laser gas flow becomes more turbulent. It is practical for one conventional discharge-pumped gas laser design to have the distance L of 0.06 m and the clearing ratio CR of about 3.

For such a conventional discharge-pumped gas laser to achieve a high repetition rate of 500 Hz, the laser gas is required to flow at a speed of 90 m/sec. or higher. Such a high-speed laser gas flow can be achieved by a large-capacity gas circulator, resulting in a large gas laser size.

SUMMARY OF THE INVENTION

It is an object of the present invention to provide a discharge-pumped gas laser which has a baffle partition for preventing a deteriorated laser gas produced by a preionizer from adversely affecting a laser gas in a main discharge region, and has a gas circulator of relatively small capacity for achieving a high repetition rate.

Another object of the present invention is to provide a discharge-pumped gas laser which has preionizer electrode pins and a laser gas that are of long service life.

According to the present invention, there is provided a discharge-pumped gas laser comprising a pressure container filled with a laser gas under pressure, a pair of main discharge means, disposed in the pressure container in confronting relationship to each other, for producing an electric discharge in the laser gas in a main discharge region defined therebetween to excite the laser gas for laser emission in a first direction, the main discharge means being elongate in the first direction, flow generating means for causing the laser gas to flow through the main discharge region in a second direction transverse to the first direction, preionizing means for preionizing the laser gas in the main discharge region, the preionizing means being disposed either upstream or downstream of the main discharge region with respect to the second direction, and flow control means, supported in the pressure container, for controlling the laser gas to flow past one of the main discharge means and the preionizing means while blocking the laser gas from directly flowing to the other of the main discharge means and the preionizing means.

The preionizing means may be disposed downstream of the main discharge region, the flow control means comprising at least one aperture for passing therethrough a laser gas flow from the preionizing means, and discharging means for discharging the laser gas flow from the preionizing means through the aperture into the main discharge region, whereby the flow control means can block the laser gas that has flowed past the main discharge means from directly flowing to the preionizing means.

Alternatively, the preionizing means may be disposed upstream of the main discharge region, the flow control means comprising at least one aperture for passing therethrough a laser gas flow to the preionizing means, and drawing means for drawing the laser gas flow from the main discharge region through the aperture to the preionizing means, whereby the flow control means can block the laser gas flow from directly flowing to the main discharge means from the preionizing means.

According to the present invention, there is also provided a discharge-pumped gas laser comprising a pressure container filled with a laser gas under pressure, a pair of main discharge means, disposed in the pressure container in confronting relationship to each other, for producing an electric discharge in the laser gas in a main discharge region defined therebetween to excite the laser gas for laser emission in a first direction, the main discharge means being elongate in the first direction, flow generating means for causing the laser gas to flow through the main discharge region in a second direction transverse to the first direction, a pair of upstream and downstream preionizing means for preionizing the laser gas in the main discharge region, the upstream and downstream preionizing means being disposed respectively upstream and downstream of the main discharge region with respect to the second direction, and flow control means, supported in the pressure container, for controlling the laser gas to flow past the main discharge means while blocking the laser gas which has flowed past the main discharge means from directly flowing toward the downstream preionizing means and also blocking a laser gas flow from directly flowing to the main discharge means from the upstream preionizing means.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a cross-sectional view of a discharge-pumped gas laser according to a sixth embodiment of the present invention.

DETAILED DESCRIPTION OF THE PREFERRED EMBODIMENTS

Figure 1:
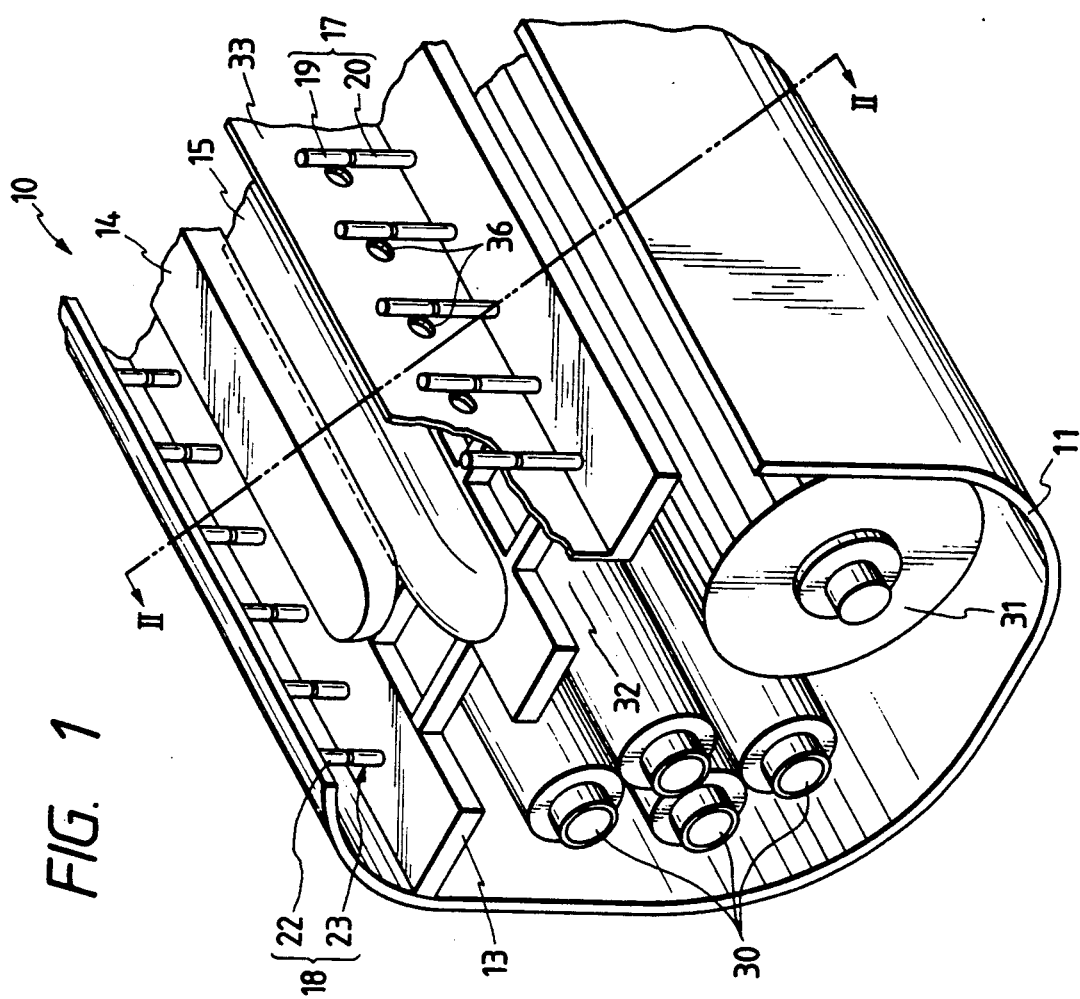
FIG. 1 is a fragmentary perspective view of a discharge-pumped gas laser according to a first embodiment of the present invention.

Like or corresponding parts are denoted by like or corresponding reference numerals throughout views.

Figure 2:
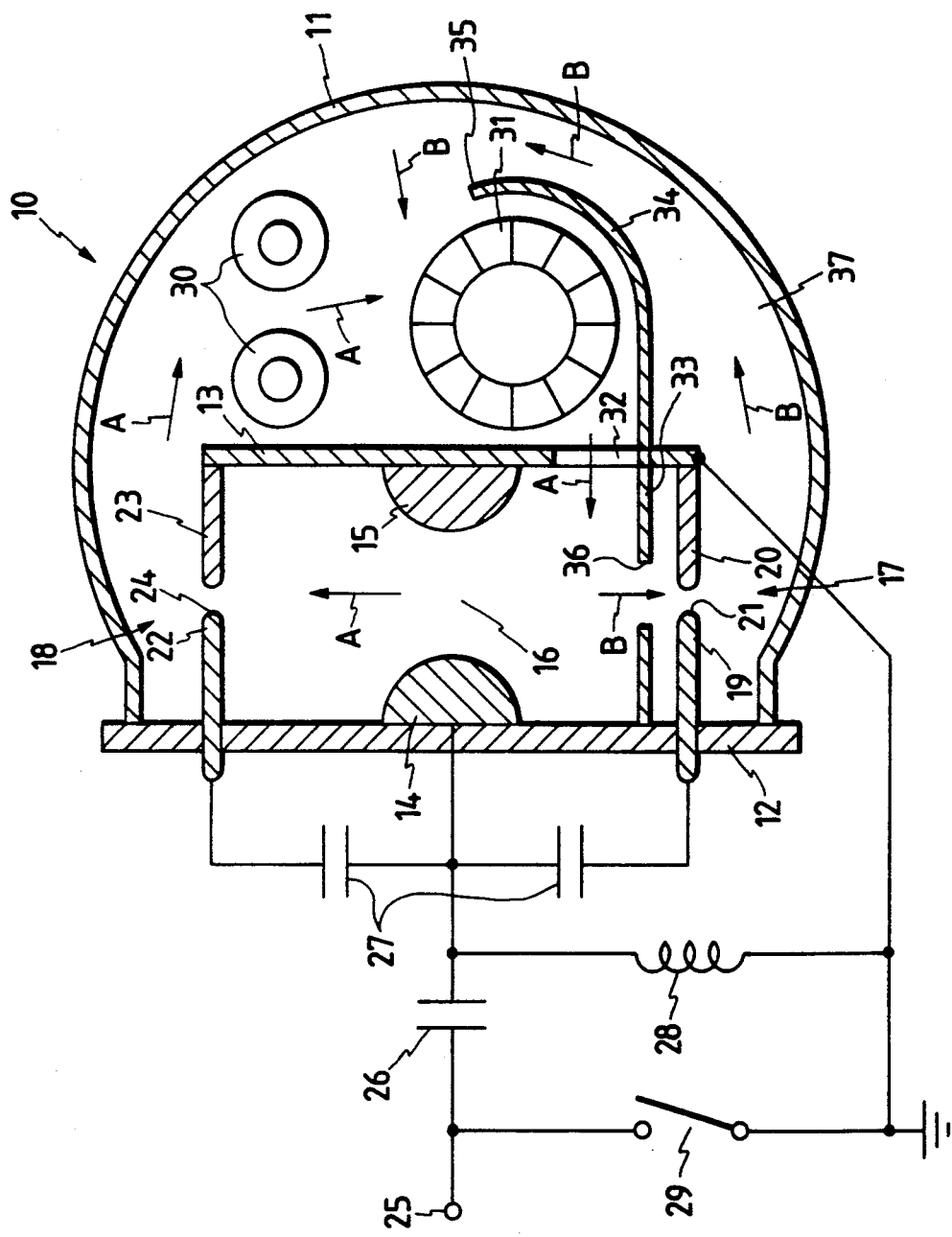
FIG. 2 is a cross-sectional view taken along line II—II of FIG. 1, with a discharge circuit connected to the discharge-pumped gas laser.

FIGS. 1 and 2 show a discharge-pumped gas laser according to a first embodiment of the present invention.

As shown in FIGS. 1 and 2, the discharge-pumped gas laser, generally denoted by the reference numeral 10, has a substantially cylindrical pressure container 11 having one side mounted on a base 12 (FIG. 2). The pressure container 11 is filled with a laser gas such as a mixture of a rare gas and a fluorine gas of a given composition ratio, for example, under a predetermined pressure.

The pressure container 11 houses therein an electrode support 13 spaced from the base 12 parallel thereto. The base 12 and the electrode support 13 support a pair of elongate main discharge electrodes 14, 15 respectively thereon which confront each other and extend longitudinally in the pressure container 11, i.e., in a direction normal to the sheet of FIG. 2. When a voltage is applied between the main discharge electrodes 14, 15, they produce an electric discharge in a space therebetween which is referred to as a main discharge region 16.

Between the base 12 and the electrode support 13, there are supported two preionizers 17, 18 that are positioned one on each side of the main discharge electrodes 14, 15, i.e., the main discharge region 16. The preionizer 17 comprises an array of spaced electrode pairs each composed of two electrode pins 19, 20 defining a gap 21 therebetween, the electrode pairs being spaced along the main discharge electrodes 14, 15. Similarly, the preionizer 18 comprises an array of spaced electrode pairs each composed of two electrode pins 22, 23 defining a gap 24 therebetween, the electrode pairs being spaced along the main discharge electrodes 14, 15. When a voltage is applied between the electrode pins 19, 20 and between the electrode pins 22, 23, they produce a spark discharge across the gaps therebetween, generating an ultraviolet radiation to uniformly ionize the laser gas in the main discharge region 16 between the main discharge electrodes 14, 15.

As shown in FIG. 2, a terminal 25 for receiving high-voltage electric energy from a high-voltage power supply (not shown) is connected to one terminal of a charging capacitor 26 whose other terminal is connected to the main discharge electrode 14 and also through peaking capacitors 27 respectively to the electrode pins 19, 22 of the preionizers 17, 18. The other electrode pins 20, 23 of the preionizers 17, 18 are grounded. A charging coil 28 is connected between the other terminal of the charging capacitor 26 and ground, and a thyratron 29 is connected between the terminal 25 and ground. The thyratron 29 can be turned on and off quickly by a trigger signal supplied from a control circuit (not shown).

The pressure container 11 further houses a plurality of elongate cooling units 30 extending longitudinally in the pressure container 11, for cooling the laser gas that flows past the cooling units 30. The cooling units 30 are positioned on one side of the electrode support 13 remotely from the main discharge electrodes 14, 15. A gas circulator 31, which is elongate in the longitudinal direction of the pressure Container 11, is also housed in the pressure container 11 adjacent to the cooling units 30. The gas circulator 31 serves to circulate the laser gas in the direction indicated by the thicker arrows A, i.e., in a circulatory path from the main discharge region 16 through the preionizer 18 and the cooling units 30 back into the main discharge region 16 through openings 32 defined in the electrode support 13. In the main discharge region 16, the laser gas flows substantially perpendicularly to the longitudinal direction of the main discharge electrodes 14, 15. With respect to the direction A, the preionizer 17 is positioned upstream of the main discharge electrodes 14, 15, and the preionizer 18 is positioned downstream of the main discharge electrodes 14, 15.

A baffle partition 33 is supported on and extends between the base 12 and the electrode support 13. The baffle partition 33 is positioned upstream of the main discharge electrodes 14, 15 near the preionizer 17 on one side thereof facing the main discharge region 16. The baffle partition 33 includes an extension 34 extending beyond the electrode support 13 away from the base 12 arcuately partly around the gas circulator 31. The extension 34 terminates at an end 35 that is spaced from the inner circumferential surface of the pressure container 11. The baffle partition 33 including its extension 34 is made of a material which gives off only a small amount of impurity gas upon exposure to ultraviolet radiation. For the sake of brevity, the extension 34 is omitted from illustration in FIG. 1. The baffle partition 33 with its extension 34 lies on one side of the main discharge region 16, the openings 32, and the gas circulator 31, and hence is effective in causing the laser gas to flow in the direction A. The baffle partition 33 has an array of spaced apertures 36 defined therein in alignment with the respective gaps 21 between the electrode pins 19, 20 of the upstream preionizer 17. The apertures 36 allow the ultraviolet radiation generated by the upstream preionizer 17 to reach the main discharge region 16 therethrough. Furthermore, part of the laser gas is permitted to flow from the main discharge region 16 through the apertures 36 and then a circulatory region or path 37 defined between the baffle partition 33 with the extension 34 and the inner circumferential surface of the pressure container 11, toward the gas circulator 31, in the direction indicated by the thinner arrows B.

During operation of the discharge-pumped gas laser 10, the laser gas in the main discharge region 16 is excited by an electric discharge produced between the main discharge electrodes 14, 15, emitting a laser beam in substantially the longitudinal direction of the main discharge electrodes 14, 15.

Operation of the discharge-pumped gas laser 10 will be described below with reference to FIG. 2. A high-voltage electric energy which is supplied from the high-voltage power supply through the terminal 25 is stored in the charging capacitor 26. When the thyratron 29 is turned on, the stored electric energy is applied to cause a spark discharge in the gaps 21, 24 between the electrode pins 19, 20 and 22, 23 of the preionizers 17, 18 and also to charge the peaking capacitors 27. The spark discharge in the gaps 21, 24 generates an ultraviolet radiation that gives rise to a UV photo-preionization for uniformly preionizing the laser gas in the main discharge region 16 thereby to increase the electron density therein up to $10^8$ electrons per cubic centimeter. As the peaking capacitors 27 are charged, the voltage applied between the main discharge electrodes 14, 15 increases. At this time, the electron density in the main discharge region 16 is rapidly increased up to about $10^{18}$ electrons per cubic centimeter. The electric energy stored in the peaking capacitors 27 flow in a pulsed fashion through the laser gas in the main discharge region 16 between the main discharge electrodes 14, 15, thus developing an electric discharge between the main discharge electrodes 14, 15. The laser gas in the main discharge region 16 between the main discharge electrodes 14, 15 is now excited for laser emission.

In the structure shown in FIGS. 1 and 2, the laser gas flowing through the main discharge region 16 in the direction A and the laser gas flowing through the upstream preionizer 17 in the direction B are separated from each other by the baffle partition 33 including its extension 34. The laser gas which flows through the apertures 36 in the baffle partition 33 is drawn through the upstream preionizer 17 and flows through the circulatory path 37 to the gas circulator 31. During operation of the discharge-pumped gas laser 10, the laser gas is deteriorated because it contains ions and metal particles which are emitted from the electrode pins 19, 20 and 22, 23 of the preionizers 17, 18 due to sputtering when the preionizers 17, 18 cause a spark discharge for preionization. While the laser gas is flowing through the circulatory path 37, however, it is purified because the ions are eliminated because of their limited life and the metal particles are settled on the walls of the circulatory path 37. In addition, the laser gas is cooled by the baffle partition extension 34 and the wall of the pressure container 11. When the purified and cooled laser gas reaches the gas circulator 31, it is mixed with the laser gas that flows from the cooling units 30. Consequently, the laser gas which circulates in the direction A is continuously purified and cooled by being mixed with the laser gas flowing from the upstream preionizer 17 through the circulatory path 37. During repetitive operation of the discharge-pumped gas laser 10, only the laser gas in the main discharge region 16 between the main discharge electrodes 14, 15 may be exchanged in each pulsed excitation cycle for spatially uniformizing the density of preionized electrons between the main discharge electrodes 14, 15. Consequently, a stable electric discharge can occur in the laser gas in the main discharge region 16 for highly efficient laser emission. Since the laser gas may be exchanged only in the main discharge region 16 between the main discharge electrodes 14, 15, the laser gas exchange may be carried out in a small region. Furthermore, the electrode pins 19, 20 of the upstream preionizer 17 are not located in the laser gas flowing in the direction A upstream of the main discharge electrodes 14, 15, but are separated from such laser gas flow by the baffle partition 33. Inasmuch as the laser gas flow in the direction A is not obstructed by the electrode pins 19, 20, the laser gas flow can easily be turned into a laminar flow. This allows the laser gas to flow at a reduced speed, so that the laser gas can be excited at an increased repetition rate even if the gas circulator 31 is of a small capacity.

Figure 3:
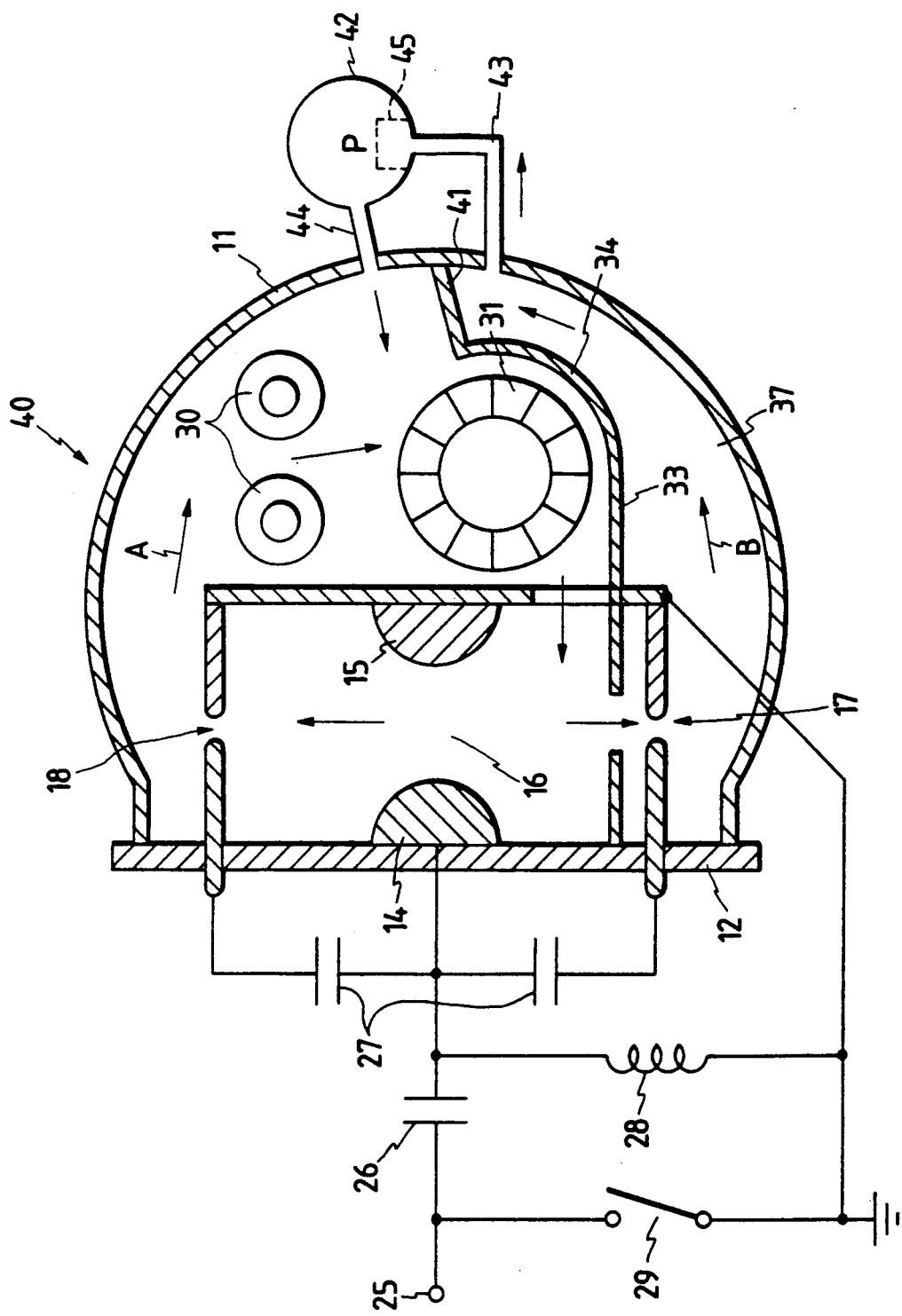
FIG. 3 is a cross-sectional view of a discharge-pumped gas laser according to a second embodiment of the present invention.

FIG. 3 shows a discharge-pumped gas laser according to a second embodiment of the present invention. The discharge-pumped gas laser, generally designated by the reference numeral 40 in FIG. 3, differs from the discharge-pumped gas laser 10 shown in FIGS. 1 and 2, in that the extension 34 of the baffle partition 33 is joined at its distal end to the pressure container 11 by a joint baffle partition 41, and an external gas circulator 42 such as a pump P is connected to the pressure container 11. The circulatory path 37 communicates with the inlet side of the external gas circulator 42 through a pipe 43, and the outlet side of the external gas circulator 42 communicates with the circulatory path along the direction A through a pipe 44. The external gas circulator 42 may have a built-in gas purifier 45 such as a filter for cleaning the laser gas flowing therethrough.

In operation, the external gas circulator 42 forcibly draws the laser gas from the upstream preionizer 17 through the circulatory path 37. Consequently, the laser gas flowing through the main discharge region 16 in the direction A and the laser gas flowing from the upstream preionizer 17 in the direction B are effectively separated from each other. The rate at which the laser gas flows through the upstream preionizer 17 can be varied for optimum laser emission by selecting the external gas circulator 42 for a different gas circulation capability.

Figure 4:
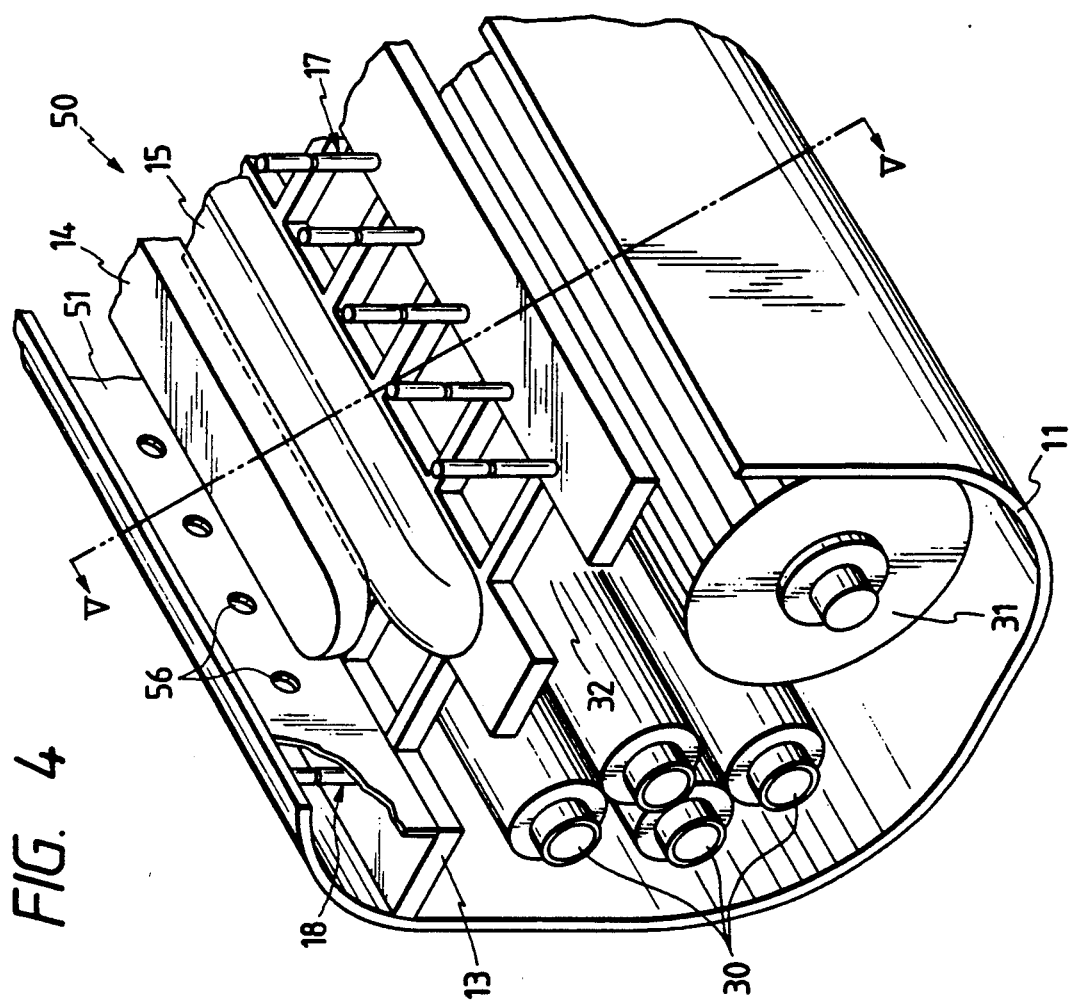
FIG. 4 is a fragmentary perspective view of a discharge-pumped gas laser according to a third embodiment of the present invention.
Figure 5:
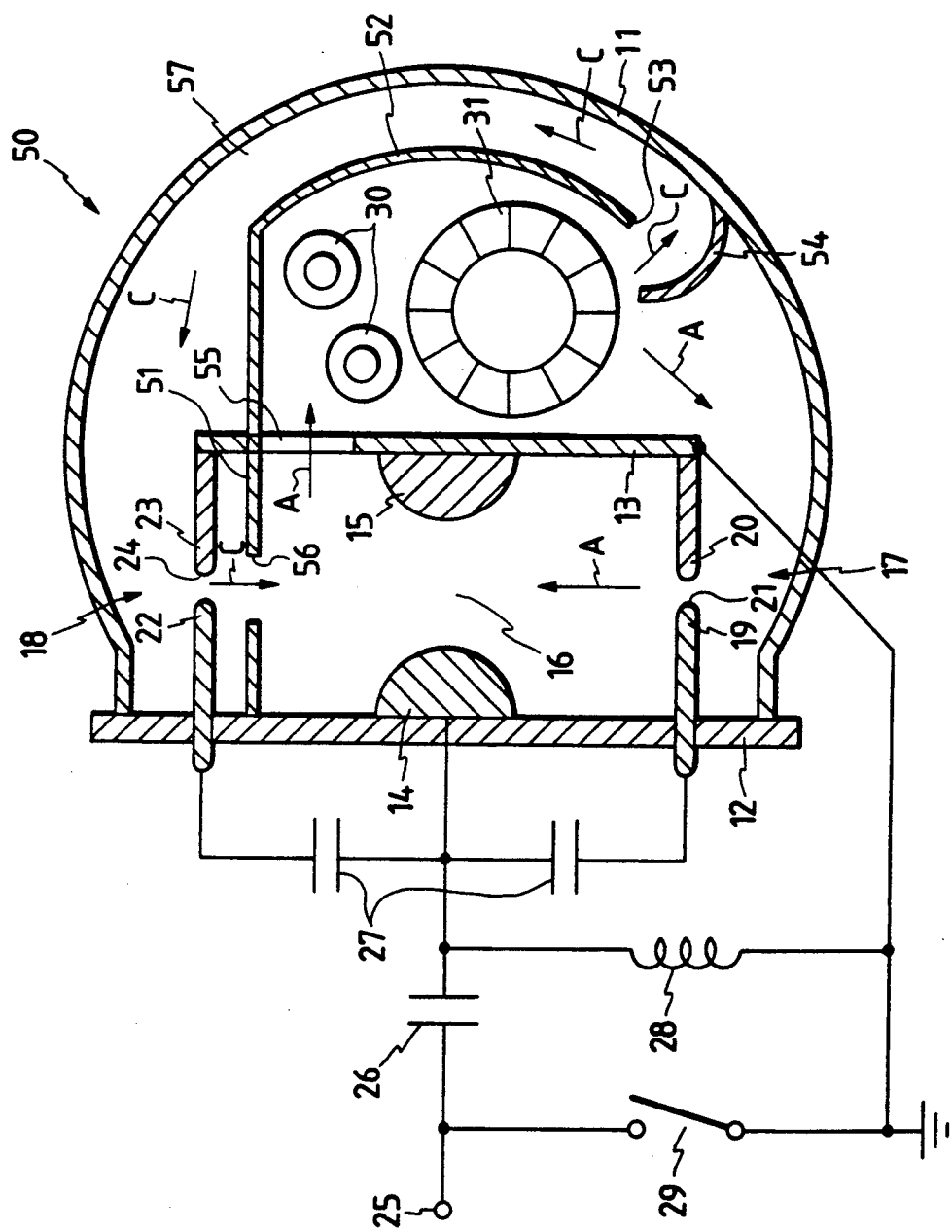
FIG. 5 is a cross-sectional view taken along line V—V of FIG. 4, with a discharge circuit connected to the discharge-pumped gas laser.

FIGS. 4 and 5 illustrate a discharge-pumped gas laser according to a third embodiment of the present invention. The discharge-pumped gas laser, generally designated by the reference numeral 50 in FIGS. 4 and 5, has a baffle partition 51 which is supported on and extends between the base 12 and the electrode support 13. The baffle partition 51 is positioned downstream of the main discharge electrodes 14, 15 near the downstream preionizer 18 on one side thereof facing the main discharge region 16. The baffle partition 51 includes an extension 52 extending beyond the electrode support 13 away from the base 12 arcuately partly around the cooling units 30 and the gas circulator 31. The extension 52 terminates at an end 53 that is spaced from the inner circumferential surface of the pressure container 11. A curved deflector wall 54 is mounted on the inner circumferential surface of the pressure container 11 in spaced-apart relationship to the distal end 53 of the extension 52 near the gas circulator 31. The baffle partition 51 including its extension 52 is made of a material which gives off only a small amount of impurity gas upon exposure to ultraviolet radiation. For the sake of brevity, the extension 52 is omitted from illustration in FIG. 4. The baffle partition 51 with its extension 52 lies on one side of the main discharge region 16, openings 55 defined in the electrode support 13, and the cooling units 30, and hence is effective in causing the laser gas to flow in the direction A. The baffle partition 51 has an array of spaced apertures 56 defined therein in alignment with the respective gaps 24 between the electrode pins 22, 23 of the downstream preionizer 18. The apertures 56 allow the ultraviolet radiation generated by the downstream preionizer 18 to reach the main discharge region 16 therethrough.

The gas circulator 31 circulates the laser gas in the direction A, i.e., in a circulatory path from the main discharge region 16 through the openings 55, the cooling units 30, the gas circulator 31, and the upstream preionizer 18 back into the main discharge region 16. Part of the laser gas flowing in the direction A is deflected from the gas circulator 31 by the deflector wall 54 and directed to flow through a circulatory region or path 57 defined between the baffle partition 51 with the extension 52 and the inner circumferential surface of the pressure container 11, toward the downstream preionizer 18, in the direction indicated by the thinner arrows C.

The other structural details of the discharge-pumped gas laser 50 are identical to those of the discharge-pumped gas laser 10 shown in FIGS. 1 and 2.

While the discharge-pumped gas laser 50 is in operation, the laser gas excited in the main discharge region 16 flows in the direction A. Part of the laser gas which is deflected by the deflector wall 54 flows through the circulatory path 57, during which time the laser gas which has been deteriorated by ions and metal particles emitted by the main discharge electrodes 14, 15 is purified because ions contained therein are eliminated because of their limited life and metal particles also contained in the laser gas are settled on the walls of the circulatory path 57. In addition, the laser gas is cooled by the baffle partition extension 52 and the wall of the pressure container 11. When the purified and cooled laser gas reaches the downstream preionizer 18, it flows through the apertures 56 into the main discharge region 16 where it is mixed with the laser gas from the upstream preionizer 17. Consequently, the preionization that is caused by the downstream preionizer 18 is prevented from being adversely affected by a deteriorated laser gas flow from the main discharge region 16. As a result, the density of preionized electrons between the main discharge electrodes 14, 15 can be spatially uniformized during repetitive laser operation. Moreover, the laser gas which circulates in the direction A is continuously purified and cooled by being mixed with the laser gas flowing from from the circulatory path 57 through the downstream preionizer 18 into the main discharge region 16. Consequently, a stable electric discharge can occur in the laser gas in the main discharge region 16 for highly efficient laser emission. In addition, since the temperature of the downstream preionizer 18 is prevented from rising, the consumption of a fluorine gas which may be contained in the laser gas can be reduced, and the electrode pins 22, 23 of the downstream preionizer 18 are prevented from damage and quick wear. Inasmuch as the laser gas may be exchanged only in the main discharge region 16 between the main discharge electrodes 14, 15, the laser gas may be excited stably at a high repetition rate.

Figure 6:
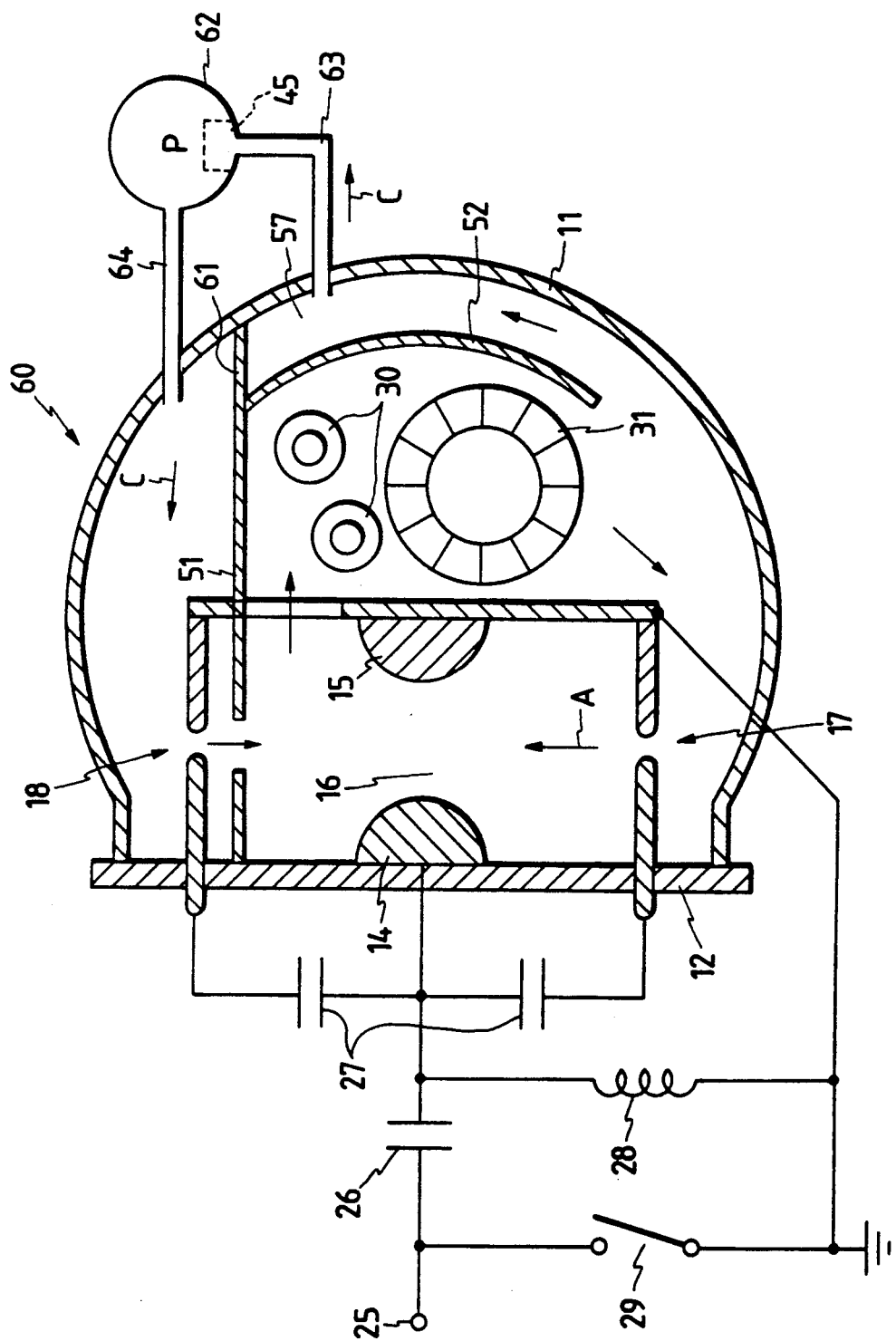
FIG. 6 is a cross-sectional view of a discharge-pumped gas laser according to a fourth embodiment of the present invention.

FIG. 6 shows a discharge-pumped gas laser according to a fourth embodiment of the present invention. The discharge-pumped gas laser, generally designated by the reference numeral 60 in FIG. 6, differs from the discharge-pumped gas laser 50 shown in FIGS. 4 and 5, in that the baffle partition 51 is joined to the wall of the pressure container 11 by a joint baffle partition 61 at the proximal end of the arcuately extending extension 52, and an external gas circulator 62 such as a pump P is connected to the pressure container 11. The circulatory path 57 is divided by the joint baffle partition 61 into a portion which communicates with the inlet side of the external gas circulator 62 through a pipe 63, and a portion which communicates with the outlet side of the external gas circulator 62 through a pipe 64.

Since the external gas circulator 62 forcibly draws part of the laser gas from the circulatory path along the direction A, the laser gas flowing through the circulatory path 57 is effectively separated from the laser gas flowing through the circulatory path along the direction A. The rate at which the laser gas flows through the downstream preionizer 18 can be varied for optimum laser emission by selecting the external gas circulator 62 for a different gas circulation capability.

In the fourth embodiment, the upstream preionizer 17 may be dispensed with, and the laser gas may be preionized by the downstream preionizer 17 only. With such a modification, since the laser gas may be exchanged only in the main discharge region 16 in each pulsed excitation cycle, and no electrode pins are located in and hence obstruct the laser gas flowing in the direction A upstream of the main discharge electrodes 14, 15, the laser gas flow can easily be turned into a laminar flow. The laser gas can thus flow at a reduced speed, so that it can be excited at an increased repetition rate even if the gas circulator 31 is of a small size.

Figure 7:
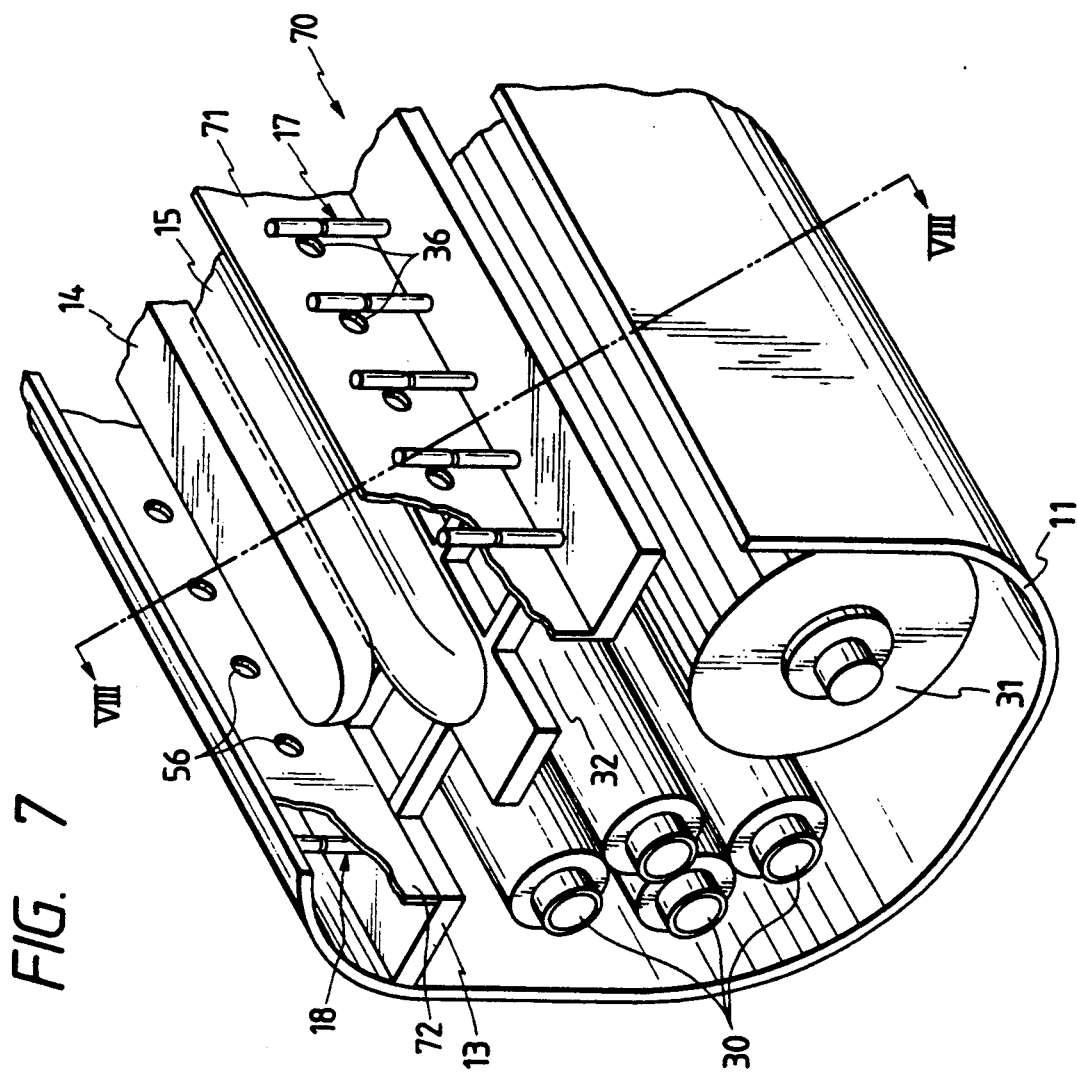
FIG. 7 is a fragmentary perspective view of a discharqe-pumped gas laser according to a fifth embodiment of the present invention.
Figure 8:
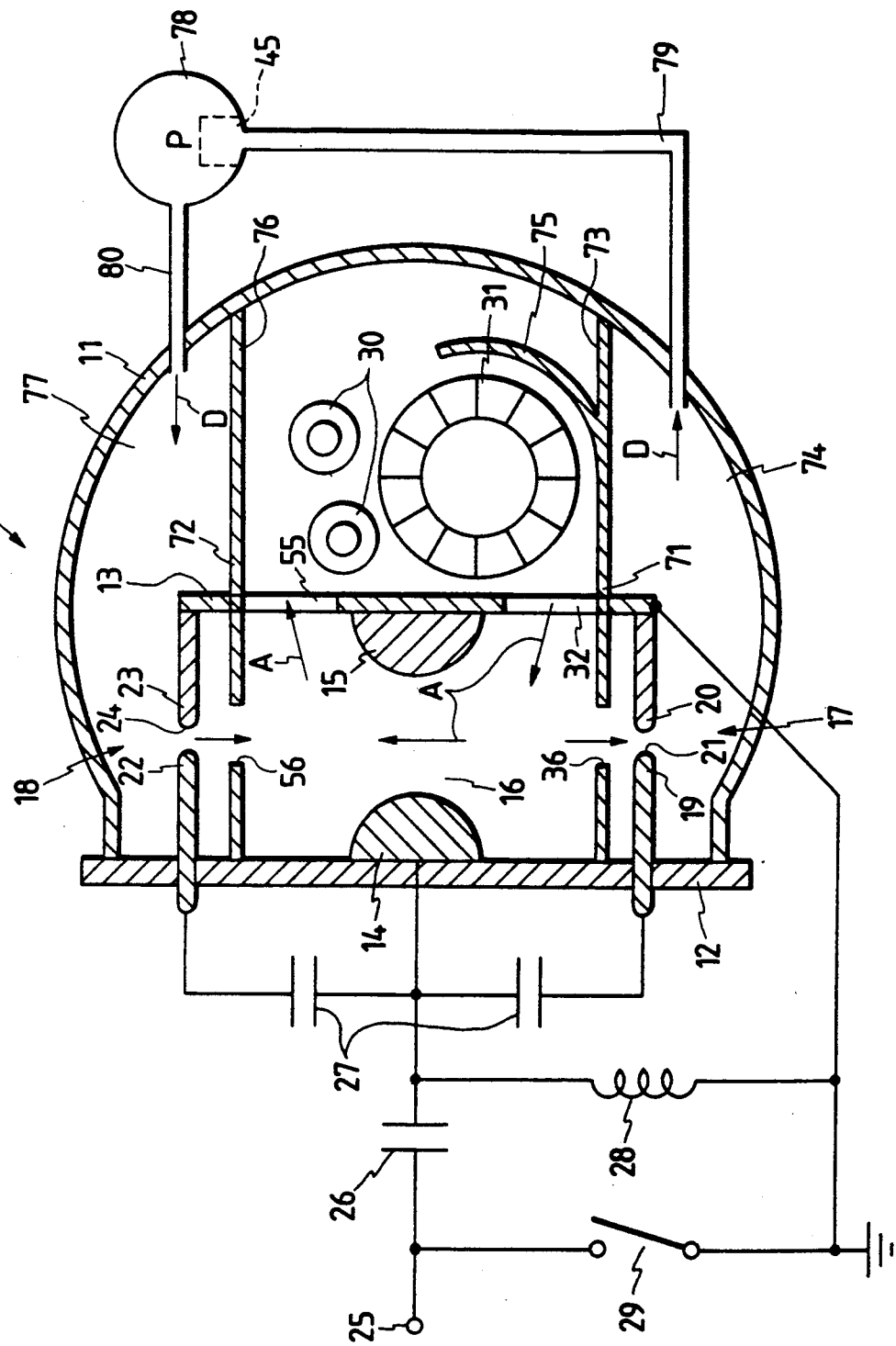
FIG. 8 is a cross-sectional view taken along line VIII-—VIII of FIG. 7, with a discharge circuit connected to the discharge-pumped gas laser.

FIGS. 7 and 8 show a discharge-pumped gas laser according to a fifth embodiment of the present invention. The discharge-pumped gas laser, generally designated by the reference numeral 70 in FIGS. 7 and 8, has two baffle partitions 71, 72 which are supported on and extend between the base 12 and the electrode support 13. With respect to the direction A of flow of the laser gas through the main discharge region 16, the baffle partition 71 is positioned upstream of the main discharge electrodes 14, 15 near the upstream preionizer 17 on one side thereof facing the main discharge region 16. The baffle partition 71 has an extension 73 which extends beyond the electrode support 13 away from the base 12 and is joined at a distal end thereof to the wall of the pressure container 11. The baffle partition 71 with its extension 73 is made of a material which gives off only a small amount of impurity gas upon exposure to ultraviolet radiation. For the sake of brevity, the extension 73 is omitted from illustration in FIG. 7. The baffle partition 71 with its extension 73 lies on one side of the main discharge region 16, the openings 32 in the electrode support 13, and the gas circulator 31, and hence is effective in causing the laser gas to flow in the direction A. The baffle partition 71 has an array of spaced apertures 36 defined therein in alignment with the respective gaps 21 between the electrode pins 19, 20 of the up stream preionizer 17. The apertures 36 allow the ultraviolet radiation generated by the upstream preionizer 17 to reach the main discharge region 16 therethrough. Furthermore, part of the laser gas is permitted to flow from the main discharge region 16 through the apertures 36 and then a circulatory region or path 74 defined between the baffle partition 71 with the extension 73 and the inner circumferential surface of the pressure container 11. A curved baffle partition 75 extends from the baffle partition 71 arcuately partly around the gas circulator 31.

With respect to the direction A, the baffle partition 72 is positioned downstream of the main discharge electrodes 14, 15 near the downstream preionizer 18 on one side thereof facing the main discharge region 16. The baffle partition 72 includes an extension 76 extending beyond the electrode support 13 away from the base 12 and joined at its distal end to the wall of the pressure container 11. The baffle partition 72 including its extension 76 is made of a material which gives off only a small amount of impurity gas upon exposure to ultraviolet radiation. For the sake of brevity, the extension 76 is omitted from illustration in FIG. 4. The baffle partition 72 with its extension 76 lies on one side of the main discharge region 16, the openings 55 in the electrode support 13, and the cooling units 30, and hence is effective in causing the laser gas to flow in the direction A. The baffle partition 72 has an array of spaced apertures 56 defined therein in alignment with the respective gaps 24 between the electrode pins 22, 23 of the downstream preionizer 18. The apertures 56 allow the ultraviolet radiation generated by the downstream preionizer 18 to reach the main discharge region 16 therethrough. A circulatory region or path 77 is defined between the baffle partition 72 with the extension 76 and the inner circumferential surface of the pressure container 11.

The circulatory path 74 communicates with the inlet side of an external gas circulator 78 such as a pump P through a pipe 79, and the outlet side of the external gas circulator 78 communicates with the circulatory path 77 a pipe 80.

The other structural details of the discharge-pumped gas laser 70 are the same as those of the discharge-pumped gas lasers according to the previous embodiments.

During operation of the discharge-pumped gas laser 70 shown in FIGS. 7 and 8, the laser gas excited in the main discharge region 16 flows in the direction A. Part of the laser gas from the main discharge region 16 is forcibly circulated by the external gas circulator 78 to flow in the direction indicated by the thinner arrows D, i.e., through the apertures 36 of the baffle partition 71, the upstream preionizer 17, the circulatory path 74, the pipe 79, the pipe 80, the circulatory path 77, the downstream preionizer 18, and the apertures 56 back into the main discharge region 16. While the laser gas is flowing in the direction D, it is purified and cooled in the circulatory paths 74, 77 in the same manner as described above with respect to the first through fourth embodiments.

A discharge-pumped gas laser 90 shown in FIG. 9 according to a sixth embodiment of the present invention is essentially the same as the discharge-pumped gas laser 70 shown in FIGS. 7 and 8 except that a dust collector 91 such as a filter F is connected in the pipe 79 for trapping metal particles contained in the laser gas that flows from the circulatory path 74 through the pipe 79 to the external gas circulator 78. Therefore, the discharge-pumped gas laser 90 is more effective to remove metal particles from the laser gas and hence to keep the laser gas clean in the main discharge region 16 than the discharge-pumped gas lasers according to the other embodiments of the present invention. Inasmuch as the laser gas remains clean for a long period of time, the electrode pins of the preionizers 17, 18 are also kept clean, prevented from damage, and hence can have a long service life.

In each of the above embodiments, the preionizers 17, 18 comprise UV (ultraviolet) preionizers for producing a spark discharge to generate an ultraviolet radiation to preionize the laser gas. However, the preionizers 17, 18 may comprise corona preionizers for producing a corona discharge to preionize the laser gas.

In the above embodiments, the cooling units 30 may be dispensed with if the laser gas can sufficiently be cooled by the baffle partition or baffle partitions and the wall of the pressure container.

Although certain preferred embodiments of the present invention have been shown and described in detail, it should be understood that various changes and modifications may be made therein without departing from the scope of the appended claims.

What is claimed is:
1. A discharge-pumped gas laser comprising:
a pressure container filled with a laser gas under pressure;
a pair of main discharge means, disposed in said pressure container in confronting relationship to each other, for producing an electric discharge in the laser gas in a main discharge region defined therebetween to excite the laser gas for laser emission in a first direction, said main discharge means being elongate in said first direction;
flow generating means for causing the laser gas to flow through said main discharge region in a second direction transverse to said first direction;
preionizing means for preionizing the laser gas substantially in said main discharge region, said preionizing means being disposed either upstream or downstream of said main discharge region with respect to said second direction; and flow control means, supported in said pressure container, for controlling the laser gas to flow past one of said main discharge means and said preionizing means while blocking said laser gas from directly flowing to the other of said main discharge means and said preionizing means.

2. A discharge-pumped gas laser according to claim 1, wherein said preionizing means is disposed downstream of said main discharge region, said flow control means comprising at least one aperture for passing therethrough a laser gas flow from said preionizing means, and discharging means for discharging the laser gas flow from said preionizing means through said aperture into said main discharge region, whereby said flow control means can block the laser gas that has flowed past said main discharge means from directly flowing to said preionizing means.

3. A discharge-pumped gas laser according to claim 2, wherein said flow control means comprises a baffle partition with said aperture defined therein, said baffle partition being made of a material which gives off a limited amount of impurity gas upon exposure to an ultraviolet radiation.

4. A discharge-pumped gas laser according to claim 3, wherein said baffle partition is joined to said pressure container.

5. A discharge-pumped gas laser according to claim 2, wherein said aperture is positioned with respect to said preionizing means for allowing an ultraviolet radiation produced by said preionizing means to reach therethrough said main discharge region to preionize the laser gas therein.

6. A discharge-pumped gas laser according to claim 2, wherein said preionizing means comprises means for producing a spark discharge to preionize the laser gas in said main discharge region.

7. A discharge-pumped gas laser according to claim 2, wherein said preionizing means comprises means for producing a corona discharge to preionize the laser gas in said main discharge region.

8. A discharge-pumped gas laser according to claim 2, further including cooling means, disposed in said pressure container, for cooling the laser gas.

9. A discharge-pumped gas laser according to claim 2, wherein said discharging means comprises external circulating means, disposed outside of said pressure container and connected to said pressure container, for drawing said laser gas flow from said laser gas and circulating said laser gas flow to said preionizing means.

10. A discharge-pumped gas laser according to claim 2, wherein said flow generating means comprises circulating means for circulating the laser gas in said pressure container.

11. A discharge-pumped gas laser according to claim 2, wherein said flow control means comprises a baffle partition with said aperture defined therein, said baffle partition being positioned downstream of said main discharge region on one side of said preionizing means which faces said main discharge region.

12. A discharge-pumped gas laser according to claim 2, wherein said discharging means includes gas purifying means for purifying the laser gas which flows to the drawing and discharging means.

13. A discharge-pumped gas laser according to claim 1, wherein said preionizing means is disposed upstream of said main discharge region, said flow control means comprising at least one aperture for passing therethrough a laser gas flow to said preionizing means, and drawing means for drawing the laser gas flow from said main discharge region through said aperture to said preionizing means, whereby said flow control means can block the laser gas flow from directly flowing to said main discharge means from said preionizing means.

14. A discharge-pumped gas laser according to claim 13, wherein said flow control means comprises a baffle partition with said aperture defined in said baffle partition, said baffle partition being made of a material which gives off a limited amount of impurity gas upon exposure to an ultraviolet radiation.

15. A discharge-pumped gas laser according to claim 14, wherein said baffle partition is joined to said pressure container.

16. A discharge-pumped gas laser according to claim 13, wherein said aperture is positioned with respect to said preionizing means for allowing an ultraviolet radiation produced by said preionizing means to reach therethrough said main discharge region to preionize the laser gas therein.

17. A discharge-pumped gas laser according to claim 13, wherein said preionizing means comprises means for producing a spark discharge to preionize the laser gas in said main discharge region.

18. A discharge-pumped gas laser according to claim 13, wherein said preionizing means comprises means for producing a corona discharge to preionize the laser gas in said main discharge region.

19. A discharge-pumped gas laser according to claim 13, further including cooling means, disposed in said pressure container, for cooling the laser gas.

20. A discharge-pumped gas laser according to claim 13, wherein said drawings means comprises external circulating means, disposed outside of and connected to said pressure container, for drawing said laser gas flow from said preionizing means and circulating said laser gas flow to said pressure container.

21. A discharge-pumped gas laser according to claim 13, wherein said flow generating means comprises circulating means for circulating the laser gas in said pressure container.

22. A discharge-pumped gas laser according to claim 13, wherein said flow control means comprises a baffle partition with said aperture defined therein, said baffle partition being positioned upstream of said main discharge region on one side of said preionizing means which faces said main discharge region.

23. A discharge-pumped gas laser according to claim 13, wherein said discharging means includes gas purifying means for purifying the laser gas which flows to the drawing and discharging means.

24. A discharge-pumped gas laser comprising:
a pressure container filled with a laser gas under pressure;
a pair of main discharge means, disposed in said pressure container in confronting relationship to each other, for producing an electric discharge in the laser gas in a main discharge region defined therebetween to excite the laser gas for laser emission in a first direction, said main discharge means being elongate in said first direction;
flow generating means for causing the laser gas to flow through said main discharge region in a second direction transverse to said first direction;
a pair of upstream and downstream preionizing means for preionizing the laser gas in said main discharge region, said upstream and downstream preionizing means being disposed respectively upstream and downstream of said main discharge region with respect to said second direction; and flow control means, supported in said pressure container, for controlling the laser gas to flow past said main discharge means while blocking the laser gas which has flowed past said main discharge means from directly flowing toward the downstream preionizing means and also blocking a laser gas flow from directly flowing to said main discharge means from the upstream preionizing means.

25. A discharge-pumped gas laser according to claim 24, wherein said flow control means comprises first and second apertures for passing therethrough laser gas flows to and from said upstream and downstream preionizing means, and drawing and discharging means for drawing the laser gas flow from said main discharge region through said first aperture to said preionizing means, and for discharging the laser gas flow from said downstream preionizing means through said second aperture into said main discharge region, whereby said flow control means can block the laser gas which has flowed past said main discharge means from directly flowing to said downstream preionizing means and block the laser gas flow from directly flowing to said main discharge means from the upstream preionizing means.

26. A discharge-pumped gas laser according to claim 25, wherein said flow control means comprises first and second baffle partitions with said first and second apertures defined respectively therein, each of said first and second baffle partitions being made of a material which gives off a limited amount of impurity gas upon exposure to an ultraviolet radiation.

27. A discharge-pumped gas laser according to claim 26, wherein said first and second baffle partitions are joined to said pressure container.

28. A discharge-pumped gas laser according to claim 25, wherein said first and second apertures are positioned with respect to said upstream and downstream preionizing means, respectively, for allowing an ultraviolet radiation produced by said upstream and downstream preionizing means to reach therethrough said main discharge region to preionize the laser gas therein.

29. A discharge-pumped gas laser according to claim 25, wherein said flow control means comprises first and second baffle partitions with said first and second apertures defined respectively therein, said first baffle partition being positioned upstream of said main discharge region on one side of said upstream preionizing means which faces said main discharge region, said second baffle partition being positioned downstream of said main discharge region on one side of said downstream preionizing means which faces said main discharge region.

30. A discharge-pumped gas laser according to claim 25, wherein said drawing and discharging means comprises external circulating means, disposed outside of said pressure container and connected to said passage means, for drawing the laser gas flow from said laser gas and circulating the laser gas flow from said upstream preionizing means to said downstream preionizing means.

31. A discharge-pumped gas laser according to claim 25, further including dust collecting means connected to said drawing and discharging means for removing particles from the laser beam which flows to said drawing and discharging means.

32. A discharge-pumped gas laser according to claim 25, wherein said drawing and discharging means includes gas purifying means for purifying the laser gas which flows to the drawing and discharging means.

33. A discharge-pumped gas laser according to claim 24, wherein said preionizing means comprises means for producing a spark discharge to preionize the laser gas in said main discharge region.

34. A discharge-pumped gas laser according to claim 24, wherein said preionizing means comprises means for producing a corona discharge to preionize the laser gas in said main discharge region.

35. A discharge-pumped gas laser according to claim 24, further including cooling means, disposed in said pressure container, for cooling the laser gas when the laser gas is circulated by said circulating means.

36. A discharge-pumped gas laser according to claim 24, wherein said flow generating means comprises circulating means for circulating the laser gas in said pressure container.

* * * * *